United States Patent [19]

Fukuda

[11] Patent Number: 4,807,049
[45] Date of Patent: Feb. 21, 1989

[54] C-TYPE COMB FILTER WITH NEGATIVE FEEDBACK

[75] Inventor: Tokuya Fukuda, Tokyo, Japan

[73] Assignee: Sony Corporation, Tokyo, Japan

[21] Appl. No.: 148,997

[22] Filed: Jan. 27, 1988

[30] Foreign Application Priority Data

Feb. 3, 1987 [JP]  Japan .................................. 62-23300

[51] Int. Cl.⁴ .............................................. H04N 9/79
[52] U.S. Cl. ..................................... 358/328; 358/329
[58] Field of Search ................. 358/31, 335, 340, 314, 358/328, 329, 336, 328; 360/38.1

[56] References Cited

U.S. PATENT DOCUMENTS

| | | | |
|---|---|---|---|
| 4,513,311 | 4/1985 | Hirai et al. ........................ | 358/31 X |
| 4,597,021 | 6/1986 | Yamamitsu et al. ............... | 360/33.1 |
| 4,734,758 | 3/1988 | Honjo .................................... | 358/31 |
| 4,766,487 | 8/1988 | Tanaka et al. ........................ | 358/40 |

*Primary Examiner*—Robert L. Richardson
*Attorney, Agent, or Firm*—Philip M. Shaw, Jr.

[57] ABSTRACT

A C-type comb filter that employs a first charge-coupled device (CCD) delay circuit and a second CCD delay circuit having an intermediate tap, whereby a delayed signal from the intermediate tap is fed back to be subtracted from the input side of the C-type comb filter to thereby form a feedback C-type comb filter, thus improving the comb filter characteristic.

9 Claims, 7 Drawing Sheets

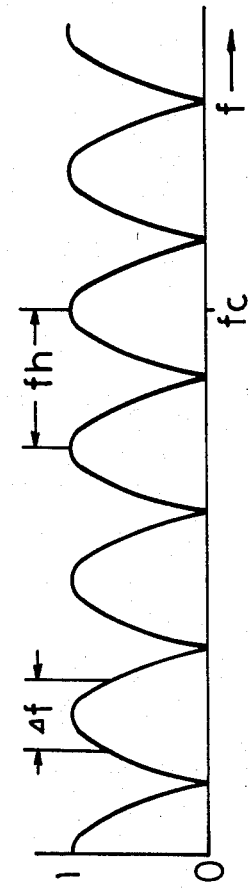
F I G. 3

4,807,049

C-TYPE COMB FILTER WITH NEGATIVE FEEDBACK

BACKGROUND OF THE INVENTION

1. Field of the Invention

The present invention relates generally to comb filter circuits and more particularly to a comb filter circuit suitable for use with a video tape recorder (VTR).

2. Description of the Prior Art

When a home VTR such as an 8 mm video tape recorder (8 mm VTR) reproduces a video signal, a cross talk component between adjacent tracks is usually generated in the luminance signal and in the carrier chrominance signal. In the following description, the cross talk component between the adjacent tracks will be referred to as the "cross talk component" for simplicity.

To solve this problem, during recording, the 8 mm VTR records the video signal in such a fashion that the luminance signal and the carrier chrominance signal are interleaved with each other between the odd-numbered field track and the even-numbered field track, or that the cross talk component is interleaved with a main signal. The main signal is what is reproduced from the original track. During reproduction, the cross talk components contained in the luminance signal and in the carrier chrominance signal cancel each other out in the comb filter.

FIG. 1 illustrates an example of a conventional comb type filter circuit for performing the above signal processing. In this example, a composite color TV signal (Y+C) is separated into a luminance signal Y and a carrier chrominance signal C.

Referring to FIG. 1, this comb type filter circuit generally comprises a comb filter section 10 formed of an integrated circuit (IC) and an integrated circuit (IC) section 20, to be explained in greater detail furtherherein, that includes a part of a processing circuit for processing the luminance signal Y and the carrier chrominance signal C.

In the comb filter circuit section 10, a CCD (charge-coupled device) delay circuit 11 is provided to have a delay time of 1H+ΔD where 1H represents one horizontal period and ΔD a predetermined number of bits of delay time. Also, CCD delay circuits 12 and 13 are provided, each of which has the same delay time of ΔD. Accordingly, since the output signals from the delay circuit 11 and the delay circuit 12 (and 13) have a time difference of just one horizontal period (1H) therebetween, it is possible to form a comb filter circuit by adding or subtracting these output signals, as will be described later in greater detail. Although an adding circuit 14 and an attenuator 15 are included in the comb filter circuit section 10, they will also be described at a later stage.

The reason that the delay circuit 11 has the extra delay time of ΔD and that the comb filter circuit section 10 includes the delay circuits 12 and 13 is as follows. Although the delay time of the CCD delay circuit can accurately be determined by a clock signal, the gain vs. temperature characteristic of the CCD delay circuit considerably fluctuates so that the fluctuating gain vs. temperature characteristic must be compensated for by some means.

To solve these problems, in the comb filter circuit section 10, signals, not delayed by the CCD delay circuit 11, are delayed by the CCD delay circuit 12 (and 13), whereby the fluctuating gain vs. temperature characteristic for each signal is compensated for. Further, since the CCD delay circuits 12 and 13 each delay the signal by the delay time of ΔD, the delay time of the CCD delay circuit 11 is determined as 1H+ΔD so that it can remove the time difference therebetween.

The IC section 20 comprises band-pass filters 22 and 38 each having a pass band of the carrier chrominance signal C, a switching circuit 24 that is connected in the opposite state to that shown in FIG. 1 when a dropout occurs and low-pass filters 31 to 33 for cancelling unwanted out-band components such as a clock component of the CCD delay circuit. In this example, each of the low-pass filters 31 to 33 has a delay time of ΔD.

The IC section 20 further comprises a delay circuit 35 for the phase compensation, a trap circuit 37 for eliminating the band components of the carrier chrominance signal C, a limiter 41, an attenuator 42 and recording and reproducing change-over switching circuits 91 to 94. Each of the switching circuits 91 to 94 is connected to a contact R during recording and to a contact P during reproduction.

During recording, this filter circuit is connected in the illustrated state in FIG. 2, thereby separating from the composite color TV signal (Y+C) the luminance signal Y and the chrominance signal C. The switches 91 and 92, shown in FIG. 1, are set in their R positions and are omitted from FIG. 2 for the sake of simplicity.

As illustrated in FIG. 2, the incoming composite color TV signal (Y+C) is supplied through the delay circuit 12 to the adding circuit 14 and is also supplied through a phase inverting amplifier 21 and the delay circuit 11 to the adding circuit 14, forming a C-type comb filter 16. Thus, the adding circuit 14 produces a signal 2C having a level twice as a high as that of the carrier chrominance signal C.

Since the C-type comb filter 16 presents a C-type comb filter characteristic over the whole band of the composite color TV signal (Y+C) as shown in the frequency characteristic diagram of FIG. 3, the signal 2C from the adding circuit 14 is supplied to the attenuator 15, in which it is attenuated into the carrier chrominance signal C of the original level and is then supplied through the low-pass filter 32 to the band-pass filter 38, a subtracter 34 and the trap 37. Thus, the band-pass filter 38 produces only the original signal C. In FIG. 3, fc represents the color sub-carrier frequency and fh the horizontal frequency.

Turning back to FIG. 2, the composite color TV signal (Y+C) is supplied through the delay circuit 13 and the low-pass filter 31 to a subtracting circuit 34, and the signal C from the low-pass filter 32 is supplied to the subtracting circuit 34, forming a Y-type comb filter 17. Thus, the subtracting circuit 34 produces the luminance signal Y.

Since the Y-type comb filter 17 presents the Y-type comb filter characteristic for the whole band of the signal (Y+C), the luminance signal Y from the subtracting circuit 34 is supplied (through the switch 93 shown in FIG. 1) to the delay circuit 35 to compensate for the delay of the trap circuit 37, and then supplied to an adding circuit 36, while the signal C with the C-type comb filter characteristic for the whole band from the low-pass filter 32 is supplied through the trap circuit 37 to the adding circuit 36. Thus, the adding circuit 36 produces the signal Y which presents the Y-type comb filter characteristic only for the band of the signal C.

Then, the thus separated, predetermined format signals Y and C are recorded on a magnetic tape (not shown).

During reproduction, the above filter circuit (FIG. 1) is connected as shown in FIG. 4 whereby cross talk components $Y_X$ and $C_X$ are respectively removed from the reproduced luminance signal Y and carrier chrominance signal C.

Referring to FIG. 4, the reproduced carrier chrominance signal C with the cross talk component $C_X$ from the tape, that is, the signal $(C+C_X)$ is supplied through the band-pass filter 22 to the adding circuit 23. At the same time, the reproduced luminance signal Y with the cross talk component $Y_X$ from the tape, that is the signal $(Y+Y_X)$, is supplied through a normal side contact N of the switching circuit 24 to the adding circuit 23. Thus, the adding circuit 23 produces an added signal S expressed as $(Y+Y_X+C+C_X)$. The signal S is supplied to the C-type comb filter 16 causing the low-pass filter 32 connected to it to produce the signal C and the cross talk component $Y_X(C+Y_X)$. Then, the signal $(C+Y_X)$ is supplied to the band-pass filter 38 which produces the signal C.

Further, the signal $(Y+Y_X)$ from the switching circuit 24 is supplied through the delay circuit 13, the low-pass filter 31 and the delay circuit 35 to a subtracting circuit 39. Simultaneously, the signal $(C+Y_X)$ from the low-pass filter 32 is supplied to the trap circuit 37 which then produces the cross talk component $Y_X$. This cross talk component $Y_X$ is supplied through the limiter 41 and the attenuator 42 to the subtracting circuit 39, forming a Y-type comb filter circuit 18. Thus, the subtracting circuit 39 produces the signal Y.

Since the cross talk component $Y_X$ is also a non-vertical correlation component and is linearly supplied to the limiter 41 and the attenuator 42, the filter 18 changes the depth (trough portion) of the curve of the out-band frequency in accordance with the cross talk component $Y_X$.

The delay circuit 11 is provided with an intermediate terminal or tap from which a signal $-S_c$ delayed by, for example, $1H-\Delta D$ is derived. This signal $-S_c$ is supplied to the low-pass filter 33 and is thereby delayed by the delay time, $\Delta D$. In other words, this signal $-S_c$ is converted into a signal $-S_d$ with a delay time of 1H by adding the delay time, $1H-\Delta D$ of the delay circuit 11 and the delay time of $\Delta D$. The signal $-S_d$ is supplied to a phase inverting amplifier 25 and is thereby inverted in phase to be a signal $S_d$. This signal $S_d$ is fed to the switching circuit 24. When a dropout occurs, the switching circuit 24 is connected to its compensating side contact C in response to a dropout detected output signal from a dropout detecting circuit (not shown), whereby the dropout is compensated for by the one horizontal period delayed signal $S_d$.

However, since the C-type comb filter 16 presents the C-type comb filter characteristic merely by subtracting the main signal and the one horizontal period delayed signal thereof, its pass band width $\Delta f$ is broad as shown by a dashed line in FIG. 5. Thus, the C-type comb filter 16 cannot remove the cross talk component $C_X$ sufficiently.

To overcome the above shortcoming, it is proposed that the C-type comb filter be modified into a C-type comb filter 6 as shown in FIG. 6. This C-type comb filter 6 is formed as a feedback type that can improve its C-type comb filter characteristic.

Referring to FIG. 6, the C-type comb filter 6 comprises a one horizontal period delay circuit 1, a band-pass filter 2, subtracting circuits 3 and 4 and an adding circuit 5. The cross talk component $C_X$ is derived from the adding circuit 5 and this cross talk component $C_X$ is fed through the band-pass filter 2 back to the subtracting circuit 3.

Accordingly, since the C-type comb filter characteristic of the filter 6 has a narrow pass band width $\Delta f$ as shown by a solid line in FIG. 5, its effect for cancelling the cross talk component $C_X$ out is improved over the C-type comb filter 16.

In this C-type comb filter 6, however, the delay time of the delay circuit 1 must be accurately selected to be one horizontal period. If the delay time of the delay circuit 1 is selected to be $1H+\Delta D$ just like the aforementioned CCD delay circuit 11, a time difference of $\Delta D$ occurs between the input signal $(C+C_X)$ and the feedback signal $C_X$ so that the C-type comb filter 6 cannot present a C-type comb filter characteristic.

To present a C-type comb filter characteristic, the delay circuit 1 in the C-type comb filter 6 must be formed of a glass delay line like the prior art. Conventionally, a glass delay line, however, is disadvantageous from an assembly parts number and mountable space standpoint.

OBJECTS AND SUMMARY OF THE INVENTION

It is a general object of the present invention to provide an improved C-type comb filter circuit.

An object of the present invention is to provide a C-type comb filter circuit which can present excellent C-type comb filter characteristics.

Another object of the present invention is to provide a C-type comb filter circuit which can be formed as an integrated circuit.

Still another object of the present invention is to provide a C-type comb filter circuit which can provide many manufacturing advantages such as reducing the number of assembly parts and reducing the mountable space.

A further object of the present invention is to provide a C-type comb filter circuit which can compensate for a dropout signal.

Yet a further object of the present invention is to provide a C-type comb filter circuit suitable for use with a video tape recorder such as an 8 mm video tape recorder and the like.

According to an aspect of the present invention, there is provided a C-type comb filter circuit comprising:

A C-type comb filter circuit for use with a reproduced color video signal formed of a luminance signal and a color carrier signal and each including respective cross talk components, the filter comprising:

(a) an input terminal;

(b) first delay circuit means, formed of a charge-coupled device (CCD), and connected to the input terminal for delaying a signal supplied thereto and outputting it with a predetermined delay time of $\Delta D$;

(c) second delay circuit means, formed of a charge-coupled device, and connected to the input terminal for delaying a signal supplied thereto and outputting it with a delay time of an integral multiple of one horizontal period $+\Delta D$, and further including intermediate tap means;

(d) adding means connected to the first and second delay circuit means for adding their outputs;

(e) means for deriving a delayed signal from said intermediate tap means; and (f) negative feeding back means for subtracting the derived delayed signal from the signal applied to the input terminal of said comb filter circuit to thereby provide a feedback type comb filter characteristic.

These and other objects, features and advantages of the present invention will become apparent from the description of the illustrative embodiments in the attached drawings, in which like reference numerals represent the same or similar elements and parts.

BRIEF DESCRIPTION OF THE DRAWINGS

FIG. 3 is a frequency characteristic representation used to explain the filter characteristic of the filter circuit shown in FIG. 2;

DETAILED DESCRIPTION OF THE PREFERRED EMBODIMENTS

Now, the present invention will hereinafter be described in detail with reference to the drawings.

Figure 1:
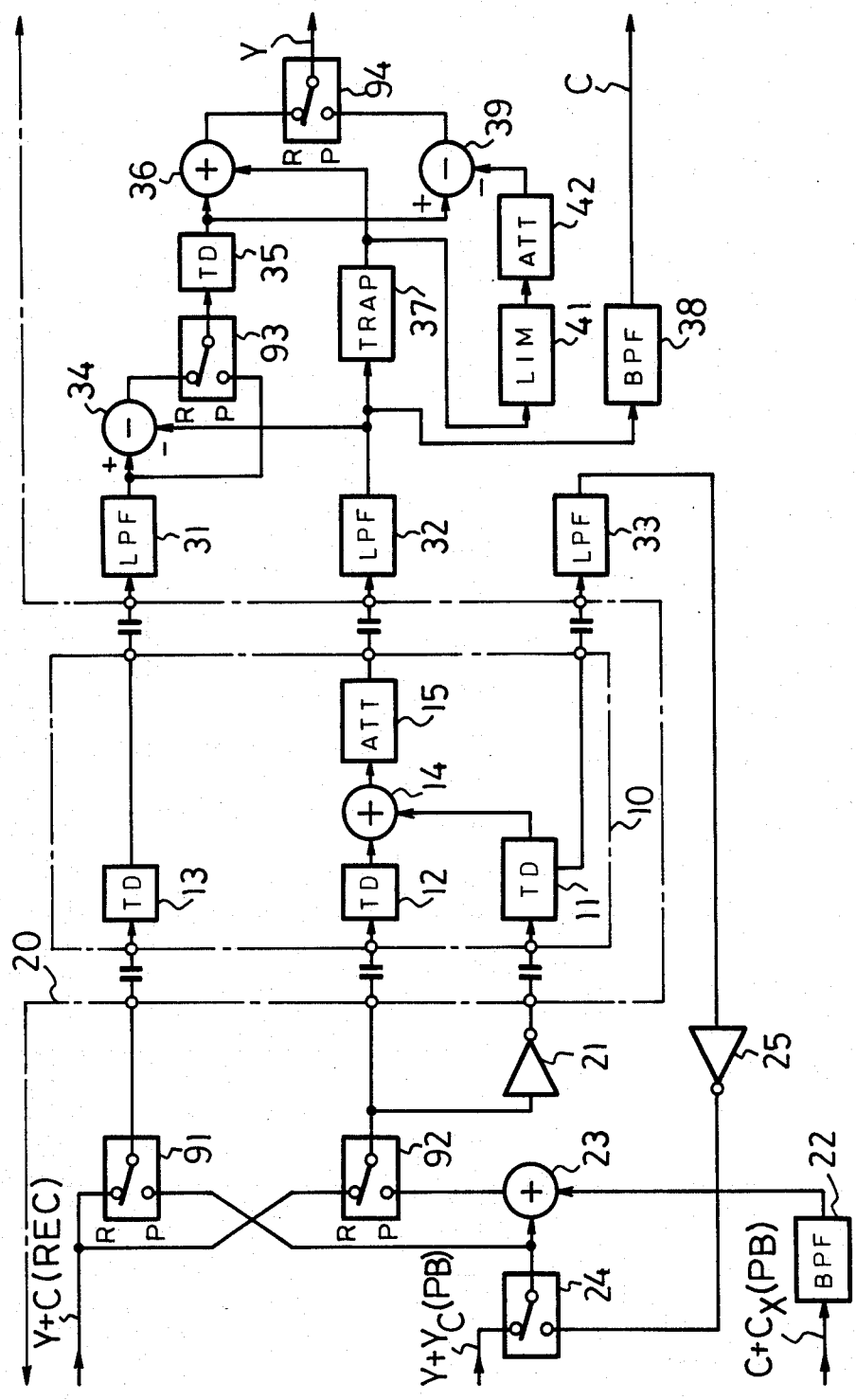
FIG. 1 is a block diagram showing an example of a known filter circuit.
Figure 2:
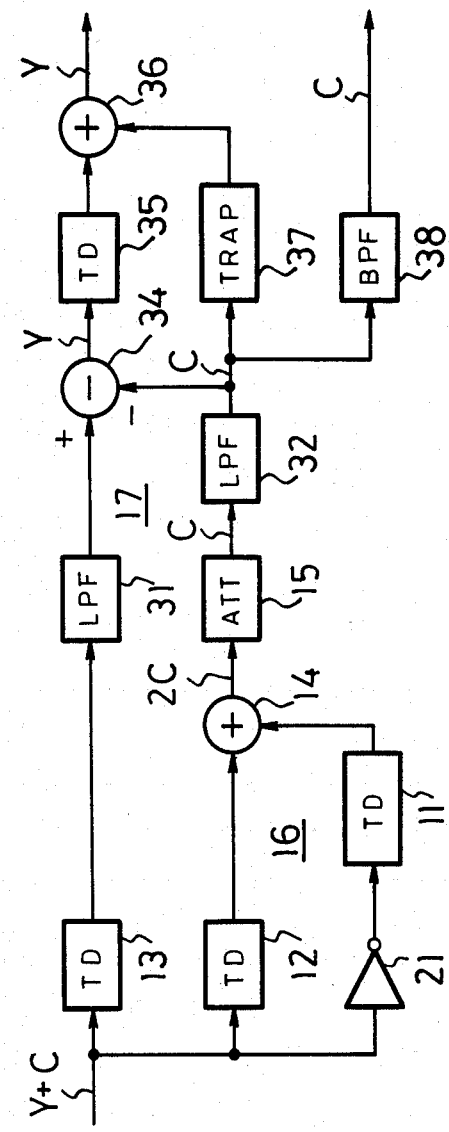
FIG. 2 is a block diagram showing the connection state of the known filter circuit in FIG. 1 upon recording.
Figure 4:
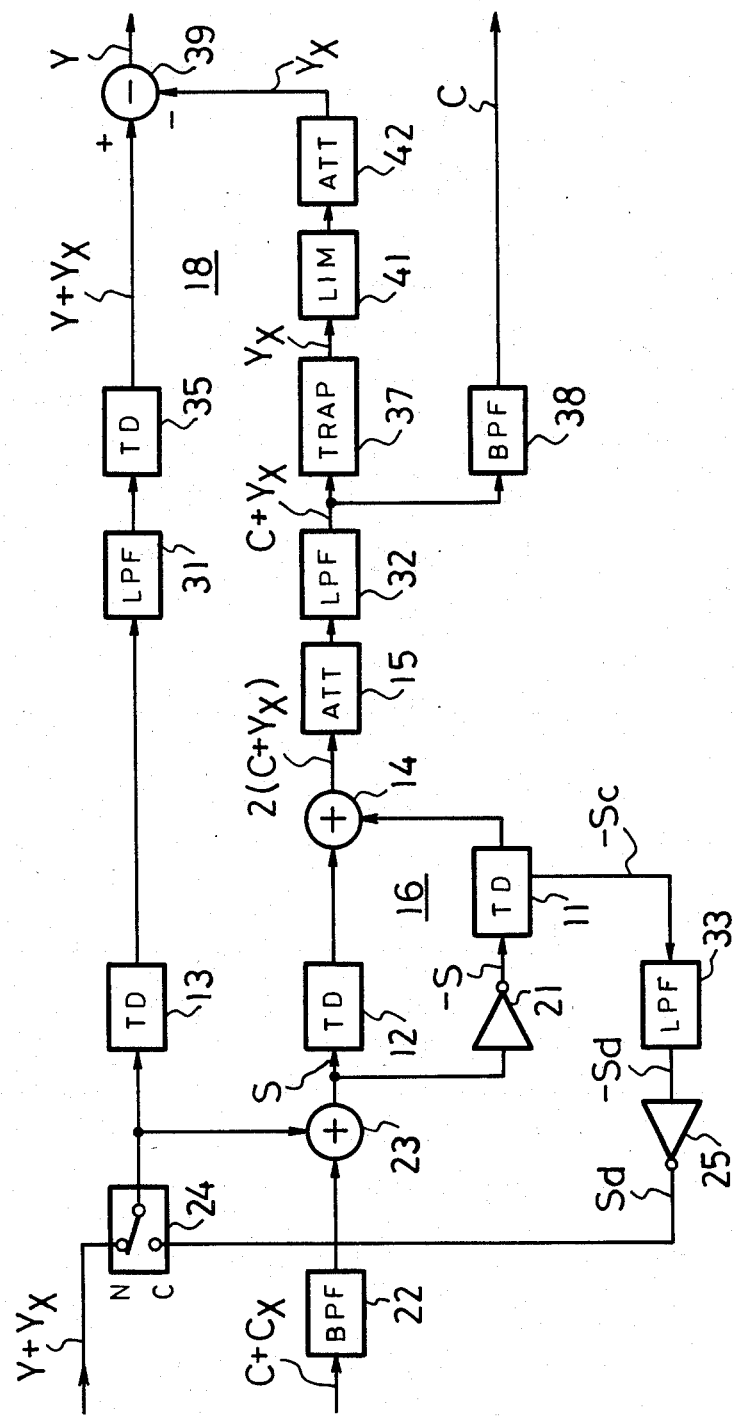
FIG. 4 is a block diagram showing the connection state of the filter circuit in FIG. 1 during reproduction.
Figure 5:
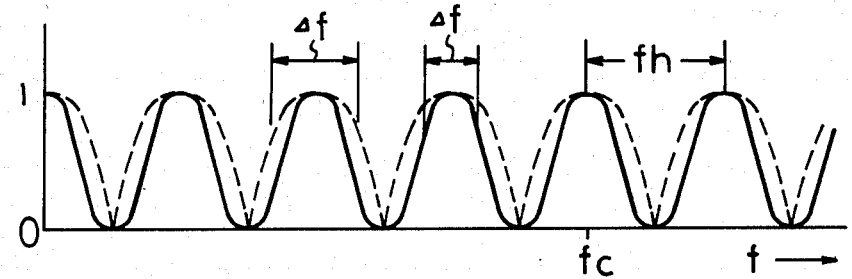
FIG. 5 is a frequency characteristic representation used to explain the filter characteristic of the filter circuit shown in FIG. 4.
Figure 7:
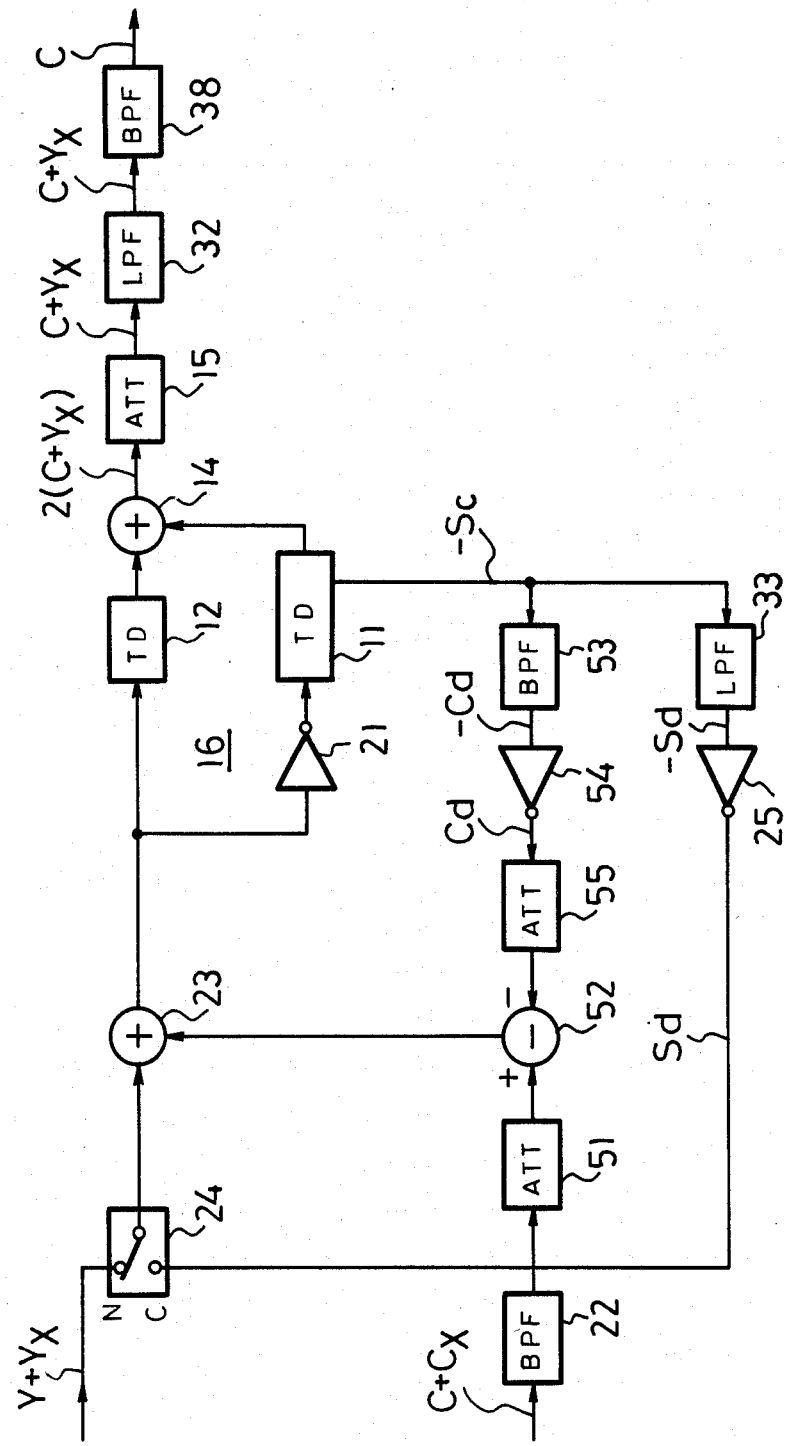
FIG. 7 is a block diagram of an embodiment of a C-type comb filter according to the present invention.

FIG. 7 illustrates an embodiment of a C-type comb filter circuit according to the present invention, mainly the connection state thereof during reproduction. In FIG. 7, like parts corresponding to those of FIG. 4 are marked with the same reference numerals and therefore need not be described in detail again.

Referring to FIG. 7, the signal $(C+C_X)$ from the band-pass filter 22 is supplied to an attenuator 51, in which it is attenuated into a signal of a predetermined level $(1-k)$ where $0<k<1$. The predetermined level $(1-k)$ signal is supplied through a subtracting circuit 52 to the adding circuit 23.

The CCD delay circuit 11 is provided with an intermediate connection terminal such as a tap or the like. The signal $-Sc$ with a delay time of $1H-\Delta D$ is derived from this intermediate tap. This signal $-Sc$ is supplied to a band-pass filter 53 which then produces a signal $-(C+C_X)$. However, at that time, since the delay time of the band-pass filter 53 is selected to be the period $\Delta D$, the signal $-(C+C_X)$ from the band-pass filter 53 becomes a signal $-Cd$ whose delay time is one horizontal period (1H) provided by adding the delay time $\Delta D$ and the delay time $1H-\Delta D$ of the CCD delay circuit The signal $-Cd$ is supplied to a phase inverting amplifier 54 and is thereby inverted in phase to be a signal $Cd$. This signal $Cd$ is attenuated into a signal of a predetermined level k by an attenuator 55 and then fed to the subtracting circuit 52.

Further, the signal $-Sc$ from the delay circuit 11 is converted to a signal $Sd$ through the low-pass filter 33 and the phase inverting amplifier 25. The signal $Sd$ is then supplied to the switching circuit 24 as a dropout compensating signal.

Figure 8:
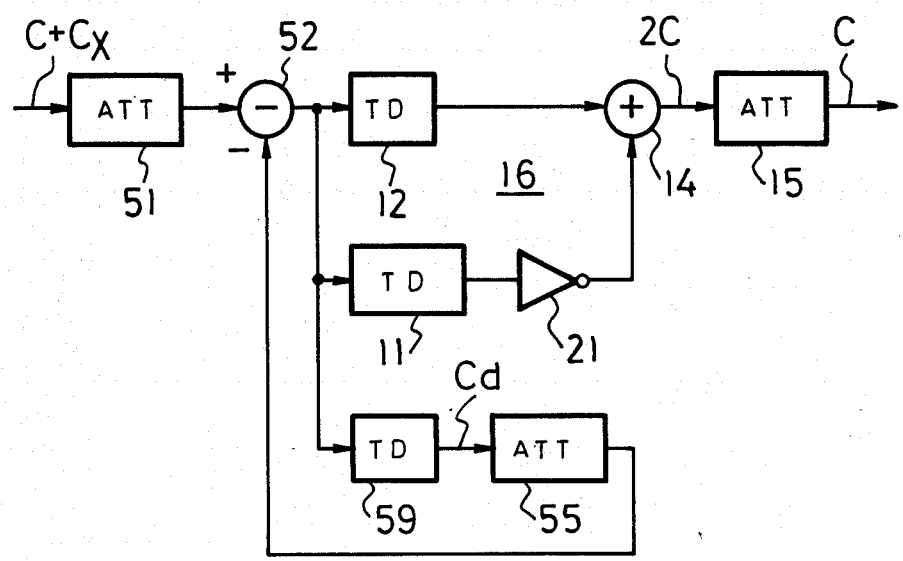
FIG. 8 is a block diagram showing an equivalent circuit forming a part of the C-type comb filter circuit shown in FIG. 7.

According to the thus made arrangement, the equivalent circuit for processing the signal $(C+C_X)$ is formed as shown in FIG. 8. Referring to FIG. 8, the above intermediate tap of the CCD delay circuit 11 and the band-pass filter 53 constitute one horizontal delay circuit 59. Further, the phase inverting amplifier 54 may be removed by reversing the position of the phase inverting amplifier 21 and the CCD delay circuit 11.

Figure 9:
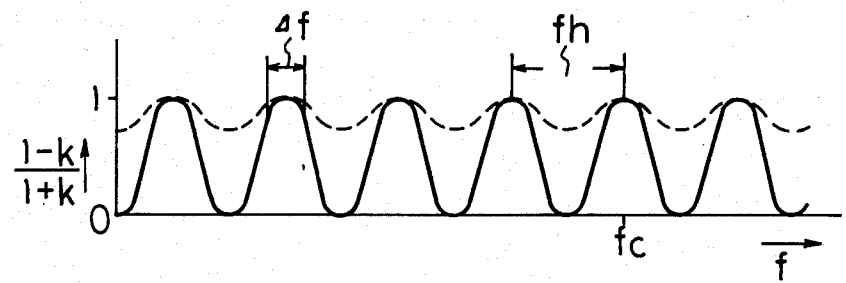
FIG. 9 is a frequency characteristic representation used to explain the frequency characteristic of the equivalent circuit shown in FIG. 8.

According to this equivalent circuit, since the one horizontal period delayed signal $Cd$ is fed back to the input side thereof, the frequency characteristic thereof has a narrow pass band width $\Delta f$ as shown by a solid line in FIG. 9 forming the frequency characteristic representation. Further, if the ratio $(1-k)/(1+k)$ is controlled in accordance with the vertical correlation, the frequency characteristic of the above equivalent circuit is changed as shown by the dashed line in FIG. 9, thus producing a dynamic frequency characteristic.

According to the present invention, as described hereinabove, since the CCD delay circuit 11 is provided with the intermediate tap and the delayed signal from the intermediate tap is fed back to the input side of the filter circuit, a feedback C-type comb filter can be realized, thus producing an excellent comb-filter characteristic with a narrow pass band width $\Delta f$.

Since the delay circuit 11 can be formed of a CCD, the C-type comb filter circuit of this invention can be formed as an integrated circuit (IC). Thus, the C-type comb filter circuit of the present invention is advantageous from an assembly parts number and mountable space standpoint, as compared with a comb filter circuit that employs a glass delay line.

Further, since the C-type comb filter circuit of this invention can compensate for dropout, it is suitable as a comb filter circuit for use with a video tape recorder.

Figure 10:
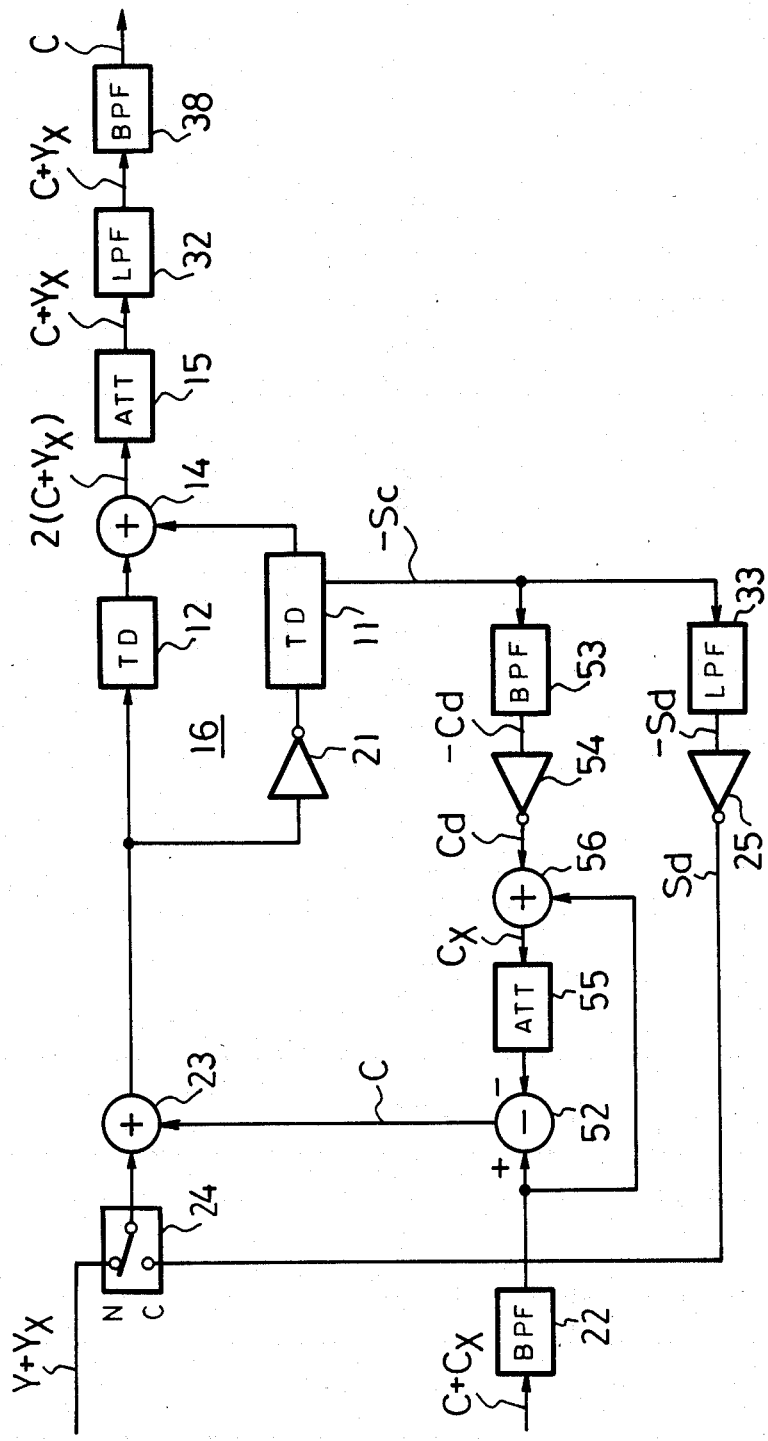
FIG. 10 is a block diagram of another embodiment of the C-type comb filter according to the present invention.

FIG. 10 illustrates another embodiment of a C-type comb filter circuit according to the present invention. In FIG. 10, like parts corresponding to those of the first embodiment shown in FIG. 8 are marked with the same references and therefore will not be described again in detail.

Figure 6:
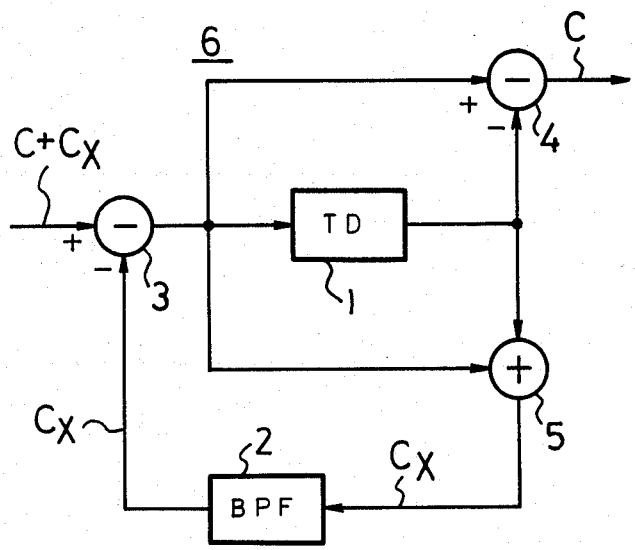
FIG. 6 is a block diagram illustrating another example of a known filter circuit that is formed as a feedback type filter circuit.

According to this embodiment, as shown in FIG. 10, the signal $Cd$ from the phase inverting amplifier 54 is added to the signal $(C+C_X)$ from the band-pass filter 22 by an adding circuit 56 so that the adding circuit 56 produces as its output the cross talk component $C_X$. Thereafter, the cross talk component $C_X$ is fed through the attenuator 55 back to be subtracted in the subtracting circuit 52. Therefore, the equivalent circuit for processing the signal C and the cross talk component $C_X$ is made the same as that shown in FIG. 6.

In this case, it should be noted that the period $\Delta D$ of the delay time $1H-\Delta D$ of the signal at the intermediate tap of the delay circuit 11 must be made equal to the delay time of the low-pass filter 33 but may be different from those of the delay circuits 12 and 13.

If the C-type comb filter circuit of the present invention processes a video signal according to the PAL (phase alteration line) system, the delay time of the CC delay circuit 11 may be selected to be 2H+ΔD.

According to the present invention, as set forth above, since the CCD delay circuit 11 is provided with an intermediate tap and the delayed signal from the intermediate tap is fed back to the input side of the C-type comb filter, a feedback type comb filter can be formed with an excellent comb filter characteristic having a narrow pass band width Δf.

Further, since the delay circuit 11 is formed of a CCD, the C-type comb filter circuit of the present invention can be formed as the integrated circuit (IC). This brings about significant advantages from an assembly parts number and mountable space standpoint, as compared with a conventional C-type comb filter circuit that employs a glass delay line.

Furthermore, since the C-type comb filter of the present invention is capable of compensating for drop out, it is suitable as a comb filter circuit for use in a video tape recorder.

It should be understood that the above description is presented by way of example of the preferred embodiments of the invention and it will be apparent that many modifications and variations could be effected by one with ordinary skill in the art without departing from the spirit and scope of the novel concepts of the invention, so that the scope of the invention should be determined only by the appended claims.

I claim as my invention:

1. A C-type comb filter circuit for use with a reproduced color video signal formed of a luminance signal and a color carrier signal and each including respective cross talk components, the filter comprising:
   (a) an input terminal;
   (b) first delay circuit means, formed of a charge-coupled device (CCD), and connected to the input terminal for delaying a signal supplied thereto and outputting it with a predetermined delay time of ΔD;
   (c) second delay circuit means, formed of a charge-coupled device, and connected to the input terminal for delaying a signal supplied thereto and outputting it with a delay time of an integral multiple of one horizontal period +ΔD, and further including intermediate tap means;
   (d) adding means connected to the first and second delay circuit means for adding their outputs;
   (e) means for deriving a delayed signal from said intermediate tap means; and
   (f) negative feeding back means for subtracting the derived delayed signal from the signal applied to the input terminal of said comb filter circuit to thereby provide a feedback type comb filter characteristic.

2. A comb filter circuit for a reproduced color video signal formed of a luminance signal and a color carrier signal and each including respective cross talk components, in which the luminance and color carrier signals are in non-coextensive frequency bands and the respective cross talk components are frequency-interleaved relative to the respective reproduced luminance and color carrier signals, the filter comprising:
   (a) input terminal means receiving a reproduced color carrier signal and a frequency-band limited, reproduced luminance signal for producing a summed output signal therefrom;
   (b) first delay circuit means, formed of a charge-coupled device (CCD), and connected to the input terminal means for delaying the summed output signal by a predetermined delay time of ΔD;
   (c) second delay means, formed of a charge-coupled device (CCD), and connected to the input terminal means for delaying the summed output signal by an integral multiple of a video including intermediate tap means;
   (d) means for deriving a delayed signal from said intermediate tap means;
   (e) negative feeding back means for subtracting the derived delayed signal from the reproduced color carrier signal supplied to the input terminal means; and
   (f) signal combining means receiving at respective first and second inputs said summed output signal as delayed by the first delay circuit means and the summed output signal as delayed by the second delay circuit means for producing a first output signal formed of the sum thereof and consisting of a color carrier signal and a cross talk component of said luminance signal.

3. A comb filter circuit as recited in claims 1 or 2 further comprising:
   (a) first attenuation means for attenuating the reproduced color carrier signal to a predetermined level (1−k) where 0<k<1 before said reproduced color carrier signal is supplied to the input terminal means;
   (b) second attenuation means for attenuating the derived delayed signal to a predetermined level k;
   (c) subtraction means, within the negative feeding back means, supplied with the attenuated reproduced color carrier signal and the attenuated delayed derived signal for supplying the difference therebetween to the input terminal means.

4. A C-type comb filter circuit according to claim 2 wherein the negative feeding back means comprises:
   (a) adding means for combining the derived delayed signal and the reproduced color carrier signal and outputting the sum thereof;
   (b) attenuating means for attenuating by one half the output of the adding means; and
   (c) subtraction means supplied with the reproduced color carrier signal and the attenuated output of the adding means for supplying the difference therebetween to the input terminal means.

5. A C-type comb filter circuit according to claims 1 or 2, in which said means for deriving a delayed signal from said intermediate tap means derives a signal whose delay time is a video horizontal scan time period −ΔD.

6. A C-type comb filter circuit according to claim 5 wherein the feeding back means comprises a band-pass filter which has a delay time of ΔD.

7. A comb filter circuit according to claim 2, further including a bandpass filter for receiving the reproduced color carrier signal and passing only said color carrier signal and said color carrier signal cross talk component to the input terminal means.

8. A color video signal processing apparatus for processing a signal reproduced from tracks on a magnetic tape in which the reproduced signal includes luminance and chrominance signals having non-overlapping frequency bands and each including respective cross talk components from tracks adjacent a track on said magnetic tape being reproduced and in which the cross talk components are frequency interleaved relative to a color video signal from a track being reproduced, the apparatus comprising;

(a) input terminal means receiving a reproduced color carrier signal and a frequency-band limited, reproduced luminance signal for producing a summed output signal therefrom;

(b) first delay circuit means, formed of a charge-coupled device (CCD), and connected to the input terminal means for delaying the summed output signal by a predetermined delay time of $\Delta D$;

(c) second delay means, formed of a charge-coupled device (CCD), and connected to the input terminal means for delaying the summed output signal by an integral multiple of a video horizontal scan time period $+\Delta D$, and further including intermediate tap means;

(d) means for deriving a signal from said intermediate tap means which is delayed by a period of a video horizontal scan time period $-\Delta D$;

(e) negative feeding back means for bandpass filtering the derived delayed signal, adding a delay of $\Delta D$, and subtracting the resulting signal from the reproduced color carrier signal supplied to the input terminal means; and (f) signal combining means receiving at respective first and second inputs said summed output signal as delayed by the first delay circuit means and the summed output signal as delayed by the second delay circuit means for producing a first output signal formed of the sum thereof and consisting of a color carrier signal and a cross talk component of said luminance signal.

9. A color video signal processing apparatus according to claim 8, further including a low-pass filter connected in series with a band-pass filter and supplied with the first output signal for passing only said color carrier signal and said color carrier cross talk component.

* * * * *